US008429741B2

(12) United States Patent
Pizano et al.

(10) Patent No.: US 8,429,741 B2
(45) Date of Patent: Apr. 23, 2013

(54) ALTERED TOKEN SANDBOXING (75) Inventors: Carlos E. Pizano, Mountain View, CA (US); Nicolas Sylvain, Santa Clara, CA (US); Jose Ricardo Vargas Puentes, San Jose, CA (US); Finnur Breki Thorarinsson, Mountain View, CA (US); Mark Alan Larson, San Carlos, CA (US)

(73) Assignee: Google, Inc., Mountain View, CA (US)

( * ) Notice: Subject to any disclaimer, the term of this patent is extended or adjusted under 35 U.S.C. 154(b) by 1002 days.

(21) Appl. No.: 12/201,967

(22) Filed: Aug. 29, 2008

(65) Prior Publication Data
US 2010/0057774 A1  Mar. 4, 2010

(51) Int. Cl.
G06F 7/04 (2006.01)
G06F 12/00 (2006.01)
G06F 12/14 (2006.01)
G06F 17/30 (2006.01)
G06D 13/00 (2006.01)
G11C 7/00 (2006.01)

(52) U.S. Cl.
USPC .................................................. 726/20; 726/9

(58) Field of Classification Search .............. 726/16–21, 726/2–5, 9
See application file for complete search history.

(56) References Cited

U.S. PATENT DOCUMENTS

| | | | |
|---|---|---|---|
| 5,974,549 A | 10/1999 | Golan | |
| 6,308,274 B1 | 10/2001 | Swift | |
| 6,505,300 B2 | 1/2003 | Chan et al. | |
| 6,731,756 B1 | 5/2004 | Pizano et al. | |
| 7,191,469 B2 | 3/2007 | Erlingsson | |
| 7,451,484 B1 * | 11/2008 | Nadalin et al. | 726/19 |
| 7,665,143 B2 * | 2/2010 | Havens et al. | 726/26 |
| 2004/0006706 A1 | 1/2004 | Erlingsson | |
| 2008/0052755 A1 | 2/2008 | Pham et al. | |
| 2009/0172330 A1 * | 7/2009 | Dewan et al. | 711/163 |

FOREIGN PATENT DOCUMENTS

| WO | WO 99/64946 A1 | 12/1999 |
|---|---|---|
| WO | WO 2008/063185 A1 | 5/2008 |

OTHER PUBLICATIONS

Ford, B. et al., "Vx32: Lightweight User-level Sandboxing on the x86," *Proceedings of the 2008 USENIX Annual Technical Conference (USENIX '08)*, Boston, Massachusetts, Jun. 2008. 14 pages.
Howard M., "Browsing the Web and Reading E-mail Safely as an Administrator," Microsoft Corporation, 2008; Downloaded from http://msdn.microsoft.com/en-us/library/ms972827(printer).aspx on Nov. 10, 2008; Published on Nov. 15, 2004; 8 pages.

(Continued)

*Primary Examiner* — Eleni Shiferaw
*Assistant Examiner* — Jing Sims
(74) *Attorney, Agent, or Firm* — Sterne, Kessler, Goldstein & Fox PLLC (57) ABSTRACT

Embodiments of the present invention relate generally to application security. In an embodiment, a method for altered token sandboxing includes creating a process based on a naked token and suspending the process. The method further includes obtaining an impersonation token and resuming the process with the impersonation token. The method further includes acquiring resources needed for the process with the impersonation token. The method also includes replacing the impersonation token with the naked token. In a further embodiment, the method further includes executing the suspended process with the naked token and the acquired resources. In another embodiment, a system for user-mode, altered token sandboxing includes a security module, an acquisition module and a replacement module. In a further embodiment, the system may include an execution module. In another embodiment, the system may include a request module.

24 Claims, 4 Drawing Sheets

OTHER PUBLICATIONS

Microsoft, "Access Control Model," Microsoft Corporation, 2008; Downloaded from http://msdn.microsoft.com/en-us/library/aa374876(VS.85,printer).aspx on Nov. 10, 2008; 1 Page. Parts of this document may have been published on or before Aug. 29, 2008.

Microsoft, "Access Control Components," Microsoft Corporation, 2008; Downloaded from http://msdn.microsoft.com/en-us/library/aa374862(VS.85,printer).aspx on Nov. 10, 2008; 2 Pages. Parts of this document may have been published on or before Aug. 29, 2008.

Microsoft, "Access Tokens," Microsoft Corporation, 2008; Downloaded from http://msdn.microsoft.com/en-us/library/aa374909(VS.85,printer).aspx on Nov. 10, 2008; 3 Pages. Parts of this document may have been published on or before Aug. 29, 2008.

Microsoft, "Interaction Between Threads and Securable Objects," Microsoft Corporation, 2008; Downloaded from http://msdn.microsoft.com/en-us/library/aa378890(VS.85,printer).aspx on Nov. 10, 2008; 2 Pages. Parts of this document may have been published on or before Aug. 29, 2008.

PCT, "Notification of Transmittal of the International Search Report and the Written Opinion of the International Searching Authority, or the Declaration, along with International Search Report and Written Opinion of the International Searching Authority," mailed Jan. 26, 2010, International Appln. No. PCT/US09/55379, International Filing Date: Aug. 28, 2009, 8 pages.

Anonymous: "Sandbox (The Chromium projects)," Retrieved from the Internet in Feb. 2012: URL: http://www.chromium.org/developers/design-documents/sandbox/ >, 8 pages, (Dec. 2009) XP55018540.

Leblanc, David, "Practical Windows Sandboxing, Part 1," Retrieved from the Internet in Feb. 2012: URL: http://blogs.msdn.com/b/david_leblanc/archive/2007/07/27/practical-windows-sandboxing-part-1.aspx, 2 pages, (Jul. 2007) XP55018671.

Leblanc, David, "Practical Windows Sandboxing, Part 2," Retrieved from the Internet in Feb. 2012: URL: http://blogs.msdn.com/b/david_leblanc/archive/2007/07/30/practical-windows-sandboxing-part-2.aspx, 2 pages, (Jul. 2007) XP55018670.

Leblanc, David, "Practical Windows Sandboxing, Part 3," Retrieved from the Internet in Feb. 2012: URL: http://blogs.msdn.com/b/david_leblanc/archive/2007/07/31/practical-windows-sandboxing-part-3.aspx, 2 pages, (Jul. 2007) XP55018669.

Wagner, David A., "Janus: an approach for confinement of untrusted applications" Retrieved from the Internet in Feb. 2012: URL: http://itslab.inf.kyushu-u.ac.jp/ssr/Links/wagner99janus.pdf, 65 pages, (Aug. 1999) XP55018744.

Supplementary European Search Report for European Patent Application No. 09810664.4, European Patent Office, Munich, Germany, mailed on Feb. 17, 2012, 10 pages.

* cited by examiner

ALTERED TOKEN SANDBOXING

BACKGROUND

1. Field of the Invention

Embodiments of the present invention relate to software applications and security.

2. Background Art

It is important for computer systems to run untrusted software securely. Untrusted code, such as spyware, viruses or adware, may be received through the Internet and executed on a computer system. During execution, these software processes may be able to unsafely access and use system resources. Executing untrusted software can compromise or destroy an unprotected computer. Untrusted software may also compromise the privacy of a computer's users.

The security of a computer process can be handled in different ways. For example, some operating systems, such as WINDOWS VISTA, presently handle security through the use of tokens. A token may encapsulate a user identity and specific rights allowed or denied to that user. A token is like a badge that identifies the bearer. Each object of an operating system is annotated with a list of users or groups that can access the object. An operating system will create a handle based on an object and a token when a desired action is granted. The handle will include the user's identity and an action the user may perform. A system may look at this handle, determine if a user can take a requested action, and then either allow or deny the requested action. Tokens may be altered to provide a limited set of privileges. These limitations may leave a process with access to either too many or too few resources.

Running software processes securely is more difficult in multi-threaded systems. Multi-threaded systems allowed processes to spawn sub processes, or threads, that can be run concurrently. A process may limit the actions its threads may take. To limit the rights of its threads or child processes, a process can copy and alter the original process token so that a more restrictive token can be attached to each thread. These token copies could be altered to restrict certain actions by the thread.

Even with these precautions, applications could use holes in security or the threading environment to access sensitive portions of the computer. Sandboxing has been developed to secure these holes. Sandboxing may be defined as a mechanism which allows a host system to execute guest code in a confined environment, so that the guest code can only affect the host system according to a defined policy. Sandboxing may be performed in kernel mode or user mode.

Kernel mode sandboxing may modify an operating system by adding additional device drivers. These device drivers provide additional privilege checking to restrict guest code from affecting the host system. Because this method deals with manipulating the operating system directly, it does not require a lot of overhead or significantly affect the performance of applications. Kernel mode sandboxing also allows users to run any application without requiring application code to be rewritten. However, kernel mode sandboxing is highly risky. A designer must write or rewrite portions of the operating system. This is a highly sensitive area, and any mistake can have drastic consequences.

In a few cases, sandboxing may take place in user mode. User mode sandboxing may be implemented as a program that can be loaded by any user, not just a privileged user. User mode sandboxing may include dynamic translation. Dynamic translation involves rewriting instruction code at execution time into a safe form before executing the code. Dynamic translation is performed, for example, with VMWARE. Because the operating system is not reconfigured or added to, user mode sandboxing is safer than kernel mode. However, user mode sandboxing reduces application performance because of the overhead involved in rewriting code during execution.

User mode sandboxing may also include segmentation. VX32 is a user-level sandbox which uses segmentation and dynamic translation. (Bryan Ford and Russ Cox, "Vx32: Lightweight, User-level Sandboxing on the x86", Massachusetts Institute of Technology, PDOS, 2008. Segmentation is implemented by cordoning off memory access for specific applications. This implementation of sandboxing requires rewriting the software code depending on the application and the operating system. It is also limited in the security it can provide. While memory cannot be accessed outside of specified regions, this system only provides memory protection. Applications may still spawn other processes and have access to other system resources.

Many network applications, such as browsers, run guest code from other sources. These applications need to be restricted in order to secure the system. But in order to start an application, the application must be granted certain access to memory and system resources. Once the application is granted access and started, that access may not be further restricted due to present system limitations. These limitations have been used by untrusted and malicious code to run unauthorized code.

What is needed is a way to run guest code in a multi-threaded system with more process security and with less performance loss.

BRIEF SUMMARY

Embodiments of the present invention relate to systems and methods for altered token sandboxing. According to an embodiment, a method for altered token sandboxing is provided. The method includes creating a process based on a naked token and suspending the process. The method also includes obtaining an impersonation token and resuming the process with the impersonation token. The method further includes acquiring resources needed for the process with the impersonation token. The method also includes replacing the impersonation token with the naked token. According to a further embodiment, the method may include executing the suspended process with the naked token and the acquired resources.

According to another embodiment, a system for altered token sandboxing is provided. The system includes a security module configured to create and suspend a process using a naked token. The system further includes an acquisition module configured to use an impersonation token to acquire resources needed for the process. The system also includes a replacement module configured to replace the impersonation token with the naked token. According to a further embodiment, the system may include an execution module configured to execute the process with the impersonation token and the acquired resources.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like refer

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments described herein refer to systems and methods for user-mode, altered token sandboxing. As described above, sandboxing allows a process to get access to safe handles. If a process gets a handle that is dangerously privileged, malicious code can destroy a program or computer or access confidential files. Some developers could be more careful. Coding bugs may provide such dangerous handles. These bugs may exist in an operating system API or in a third party component. Some software gives users handles with more privilege than is necessary. Most WINDOWS users run programs with Admin-level privileges. Application installers sometimes create objects with a security descriptor that gives everyone full access to it. Many handles allow users to modify objects.

According to an aspect of the invention, sandboxing may prevent malicious code from obtaining bad handles and affecting a host system or reading a user's personal files. Sandboxing may protect against things such as buffer overflows, integer overflows, and format parsing/decoding flaws that could be exploited. User mode, altered token sandboxing works within the framework of the operating system. In one embodiment, an example operating system may be, but is not limited to, WINDOWS VISTA, WINDOWS XP, or other MICROSOFT operating system. User mode, altered token sandboxing does not require modification of the operating system, and it does not inspect or rewrite pieces of code. It leverages the operating system to keep things safe. This requires a knowledge of the operating system in order to make necessary API calls. User mode, altered token sandboxing prevents access to files, pipes, threads, process, tokens registry keys, inter-process communication (IPC) objects and WINDOWS services. It may not limit access to central processing unit (CPU) usage but use of a CPU can be controlled by the use of a job, as described below.

Handles may be provided based on altered tokens, or tokens with a different set of privileges than the user. These less-privileged tokens may limit what processes may be effected. For instance, plug-ins may be given lesser rights to the file system or registry and no rights to operating system services. However, limited privileges are often not limited enough as these less-privileged processes may still be able to access the file system and registry. Some operating system engineers have created least-privilege tokens, or tokens with a minimum amount of privileges. To start a process, the operating system requires the parent process to have access to certain key components. Some privileges are required during some periods of processing or else a process will fail.

According to an embodiment, all privileges and effective groups may be removed from a token in order to produce a naked token. A naked token has no privileges. A naked token would have no access, for example, to the file system, registry, operating systems services or APIs. Engineers previously have not used naked tokens because they believed that naked tokens would have resulted in many process request denials upon execution of a new process. These denials would cause an operating system to forcefully abort process creation or the process would crash. This might have been the case if a process had a naked token during its entire lifetime. Typically, once a process is started, its rights may not change.

Figure 1:
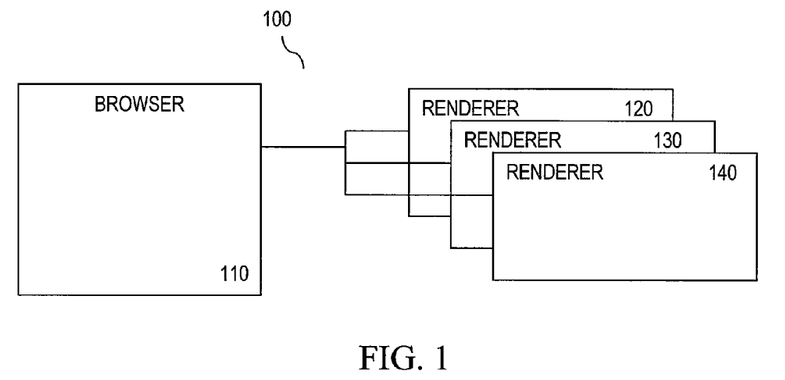
- FIG. 1 is a diagram illustrating an application having multiple process, according to an embodiment of the present invention.

According to an aspect of the invention, a sandboxed application may require two processes, a parent process and a child process. These processes may be referred to as a broker and a target. These can both have the same process image. Both processes may use a sandbox library, which provides a high-level API for managing sandboxing. A broker may be, for example, a browser. FIG. 1 shows browser 110 in exemplary system 100, illustrating a multi-process application, according to an embodiment. In such a case, a target process may be a renderer. There may be multiple renderers (120-140), as shown in FIG. 1. The browser may run trusted code while each renderer may run guest code or untrusted code. For example, renderer 120 may execute JAVASCRIPT. Renderer 130 might perform HTML rendering or image decoding. Renderer 140 may run a plug-in or a flash object. These renderer processes may be locked down with sandboxing. That is, the sandboxing will secure the processes. The privilege perimeter will ensure that any external code that gets loaded will fail if it tries to create or open objects.

Figure 2:
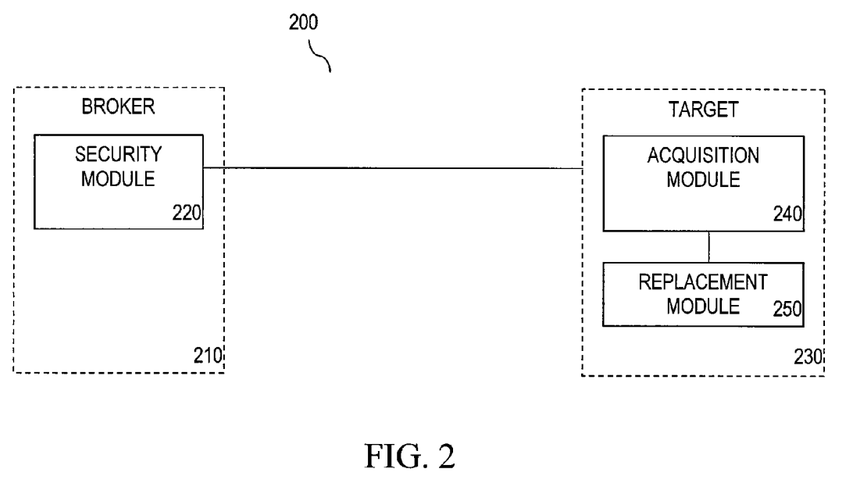
FIG. 2 is a diagram showing a system for altered token sandboxing, according to an embodiment of the present invention.

FIG. 2 illustrates an exemplary system 200 for altered token sandboxing, according to an embodiment. System 200 includes security module 220, acquisition module 240 and replacement module 250. Broker 210 may be a process that starts with a logged on user's privileges or token. Broker 210 initiates sandboxing using a broker services API. It may also use a sandboxing library. Broker 210 may use security module 220. Security module 220 is configured to create and suspend a process based on a naked token. This process may be represented by target 230. Target 230 may also be a sub-process or a thread. Target 230 may have a naked token.

According to an aspect of the present invention, a naked token removes all access privileges from the target process. When a thread attempts to access an object, an operating system security manager may compare the principals listed in the thread's access token against the rights defined on the object's discretionary access control list (DACL). A naked token may not allow actions based on a DACL. A target process running with a naked token cannot access any object with a non-NULL DACL. Objects with NULL DACLs cannot be secured either, because a security manager skips the access check.

Principals are represented by security identifiers (SIDs) representing the token owner and all group membership. According to an aspect of the present invention, a token may be made naked in at least three ways. First, a token may enumerate all SIDs in the original token and mark them DENY_ONLY, according to an embodiment. When a SID is marked DENY_ONLY, a security manager will only use the SID to check if access is denied; the SID cannot be used to grant access to an object. Second, an SID may be added to the Restricted_SIDs list, according to a further embodiment. This is needed where all SIDs are not marked DENY_ONLY. If a Restricted_SIDs list is not NULL, a security manager may do a two-pass authorization check. Access is first checked using the regular SIDs list and then the Restricted_SIDs list. Access must be granted in for a thread to get access to an object. Third, all privileges and SIDs may be removed, according to an embodiment.

Target 230 may also be associated with a job object, according to an embodiment. This restricts behaviors that are not subject to security manager checks. The job prevents target 230 from: sending window messages to processes outside the job, creating new processes, creating or changing desktops, changing display settings, calling an exit function, using the global Atoms table, using user handles owned by other processes, reading/writing the clipboard, changing system parameters, or excessively using a CPU or memory. Security module 220 may set the security level of a job object to which a target process will belong. The job object's security level cannot be changed once the target process is spawned.

Security module 220 then resumes target 230. Security module 220 may resume target 230 with an impersonation token, according to an embodiment. The impersonation token may have a user's privileges so it can access objects. It may be based on a user token of broker 210. According to a further embodiment, the impersonation token may also be a token with full privileges. According to an embodiment, this token may have some restricted privileges. It may also include one or more handles required to acquire the resources necessary for the process. According to another embodiment, a token may have just enough privilege to acquire resources and proceed to a main function, and no more. The impersonation token may not have administrator rights but may do work as needed.

According to another embodiment, a handle of a process may be duplicated. The handle may then be transferred to a thread of the process, such as target 230. According to a further embodiment, target 230 may resume with an impersonation token. Initialization or further initialization of the process may take place before approaching the main function on the thread. Acquisition module 240 may be called by target 230. Acquisition module 240 may be coupled to security module 220 directly or through API intercepts.

According to an embodiment, acquisition module 240 is configured to use an impersonation token to acquire resources needed for the process. A necessary handle, a dynamic link library (DLL), a plug-in, an interface, or a memory allocation may be acquired. Acquisition module 240 may also acquire resources necessary to execute the operating system (OS) loader, find a main function of an application, proceed to a main function of a process, execute a main function of a process, or execute a run-time library.

According to an embodiment, replacement module 250 may be configured to replace the impersonation token with a naked token. The impersonation token may be released. A naked token may then be the remaining token. The naked token may also be a default token. According to a further embodiment, replacement module 250 may also be configured to lower the token to be naked. Replacement module 250 may be an API call by target 230 to lower its token. According to a further embodiment, target 230 may not make explicit calls to the broker. The calls may be made from API intercepts when the sandbox policy allows it.

Figure 3:
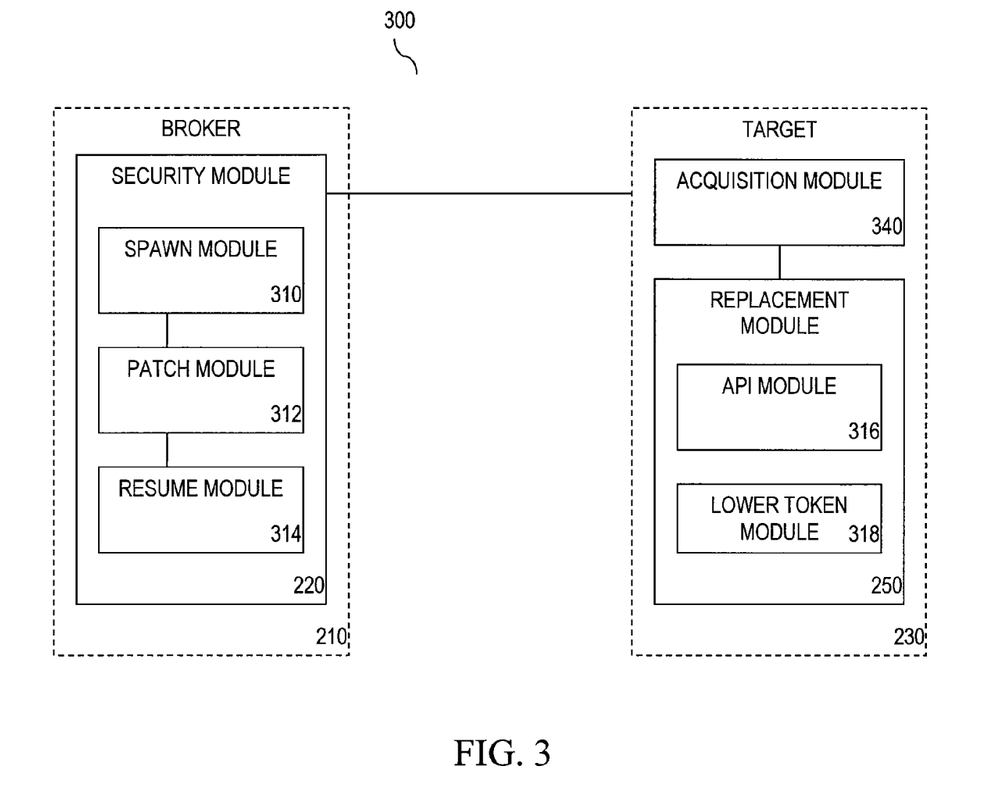
FIG. 3 is a diagram showing a more detailed system for altered token sandboxing, according to an embodiment of the present invention.

FIG. 3 illustrates an exemplary system 300 for altered token sandboxing with additional modules for assisting sandboxing, according to an embodiment. System 300 may include security module 220, acquisition module 240 and replacement module 250. Security module 220 may include spawn module 310. Spawn module 310 may be configured to create a process using a naked token and suspend the process. The process may be suspended prior to executing a first instruction of the process. Suspension may also take place prior to a specified instruction of the process. Security module 220 may replace a create process function with a spawn target function, such as spawn module 310. According to a further embodiment, the created process may have a thread. In this case, it may be the thread of this created process that is suspended.

Security module 220 may also include resume module 314, according to an embodiment. Resume module 314 may be configured to resume the suspended process. Resume module 314 may replace a user token with an impersonation token prior to resuming the process. This replacement may also be performed by security module 220, spawn module 310 or replacement module 250. According to a further embodiment, resume module 314 may resume the process for acquisition module 240.

According to an embodiment, broker 230 may make calls to the sandbox API to set up a sandbox. Broker 210 and target 230 may use API intercepts for communication. Such communication may be prepared by security module 220. According to a further embodiment, security module 220 may include patch module 312. Patch module 312 may be configured to generate at least one API wrapper. Patch module 312 may also be configured to set up API patches. It many cases, target 230 may not contain code that makes explicit calls to broker 210 from target 230. The calls may be made from API intercepts when the sandbox policy or configuration allows it. According to a further embodiment, target 230 may not open files and network ports. If target 230 needs any such resources, it may request the resources from broker 210. Interception capabilities allow for flexibility in dealing with low privilege applications. However, user mode interceptions are not the place to enforce security as they can be bypassed by malicious code.

According to an embodiment, a sandboxing inter-process communication (IPC) may be a low-level, high-performance IPC crafted to perform same machine cross-process call invocations. Such an IPC can occur at the NTDLL layer. An IPC may be blocking on a target side but multiple target-side threads can have IPC serviced simultaneously. An IPC may also be designed for small payloads that can be expanded to handle larger payloads.

According to a further embodiment, an IPC may be a channel. A channel may include a shared memory section and two events. Each channel can only service one IPC at a time, but between broker 210 and a target 230, there may be several channels, all lined up in a larger memory section. The two events are used to signal three different phases of an IPC. Target 230 initiates IPC by copying data into the section. When broker 210 is signaled by target 230, broker 210 copies the data out, processes it and fills the section with the result. Broker 210 signals to target 230 that the IPC result is ready. Target 230 is awakened.

Replacement module 250 may include API module 316, according to an embodiment. API module 316 may be configured to replace an impersonation token with a naked token. According to another embodiment, replacement module 250 may include lower token module 318. Lower token module 318 may be configured to lower the impersonation token to the naked token. Replacement module 250 may have either API module 316 or lower token module 318. According to a further embodiment, replacement module 250 may have both.

Figure 4:
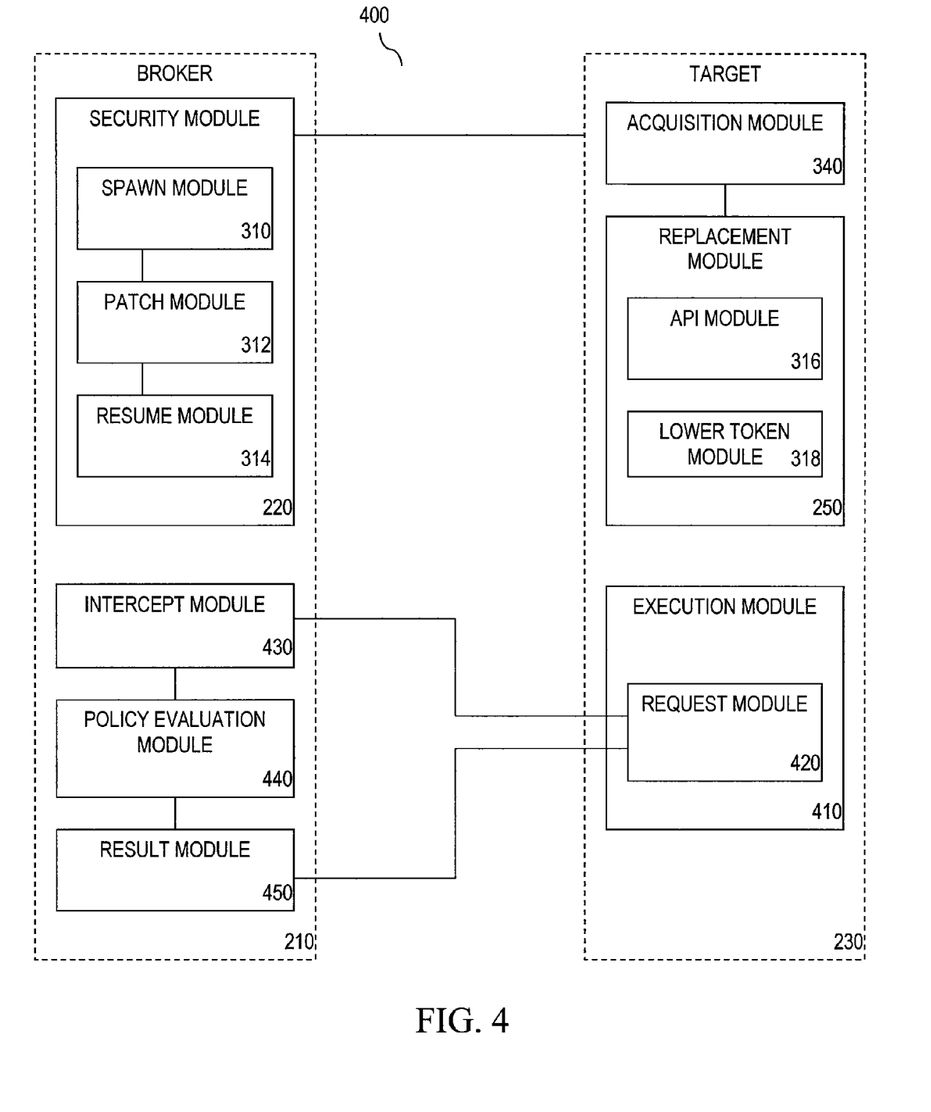
FIG. 4 is a diagram showing a system for altered token sandboxing that may request additional resources, according to an embodiment of the present invention.

FIG. 4 illustrates an exemplary system 400 for altered token sandboxing, according to an embodiment. System 400 may include the components of system 300 but further include execution module 410. Execution module 410 may be configured to execute the process with the naked token and the acquired resources. Execution module 410 may be configured to execute the process with the naked token prior to the main function of the process. Execution may also take place at the main function. The acquired resources should allow for complete execution of the main function.

According to a further embodiment, execution module 410 may include request module 420. Request module 420 may be configured to generate a request for additional resources. This request may take place after acquiring resources with an impersonation token and then dropping the impersonation token. To handle this request for additional resources, broker 210 may include intercept module 430, policy evaluation module 440 and result module 450, according to an embodiment. Intercept module 430 may be configured to intercept a request for additional resources.

Policy evaluation module 440 may be configured to receive the intercepted request, evaluate the intercepted request against a policy, and return a policy evaluation result. The policy may include privilege information, a DACL, or use any other common methods for access verification. According to an embodiment, policy evaluation may involve code generation on the fly. Policy op codes may be used. A mini-program may be used to generate the code. Performance may be improved using such pre-compiled code.

Results module 450 may be configured to receive the policy evaluation result from the evaluation module, execute at least one requested operation, and return at least one additional resource to the execution module.

Figure 5:
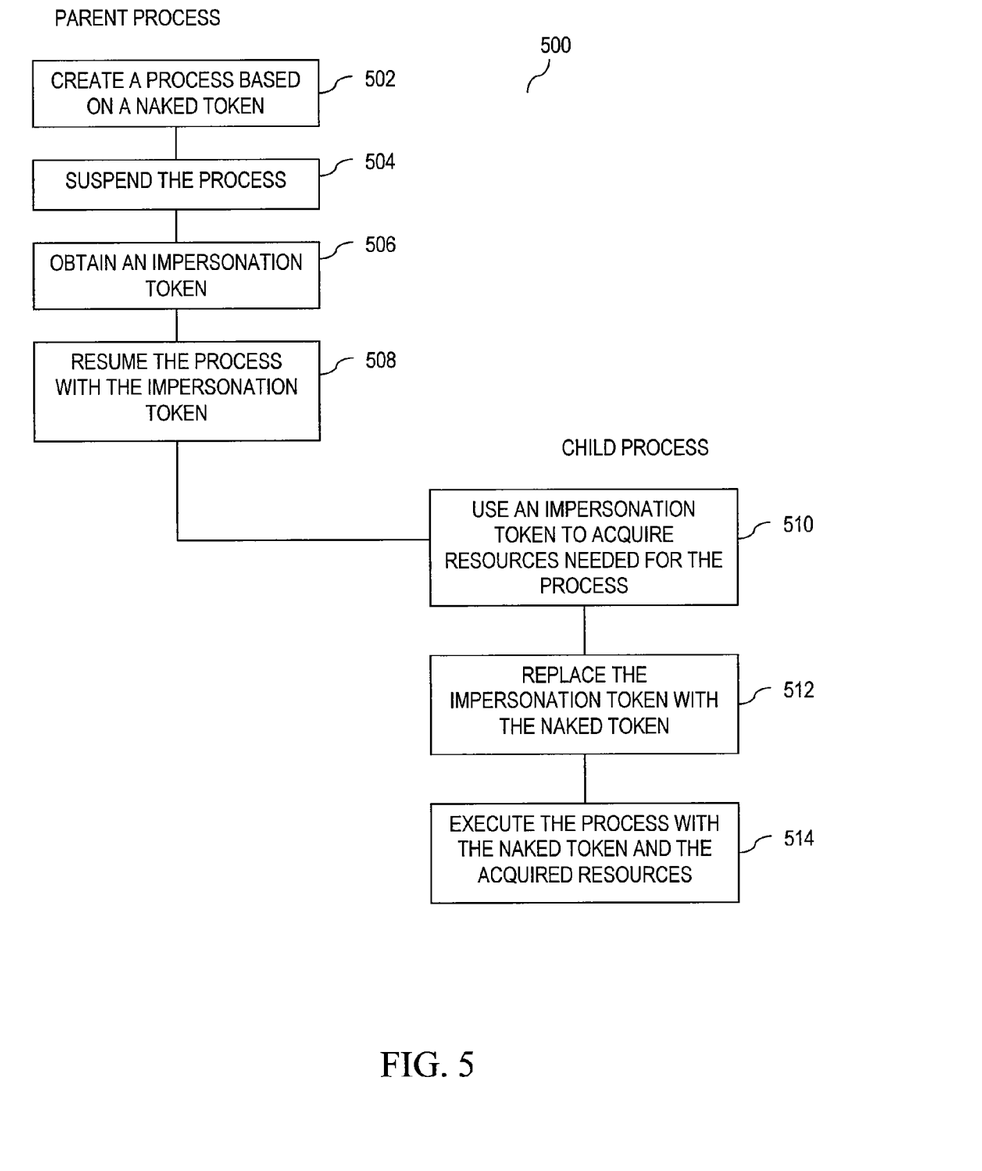
FIG. 5 is a flowchart illustrating a method for altered token sandboxing, according to an embodiment of the present invention.

FIG. 5 illustrates an exemplary method 500 for altered token sandboxing (502-514), according to an embodiment. In step 502, a process is created based on a naked token. In step 504, the process may be suspended. In step 506, an impersonation token may be obtained. In step 508, the process may be resumed with the impersonation token. Steps 502-508 may be performed by security module 220. According to a further embodiment, step 502 may be performed by spawn module 310. Step 508 may also be performed by resume module 314. According to an embodiment, a job may be assigned after step 504. According to a further embodiment, intercepts may also be setup after step 504. Steps 502-508 may be performed by a parent process, such as broker 210.

In step 510, the impersonation token may be used to acquire resources needed for the process. These include resources needed to load any necessary resources to prepare to start the main function. Other resources that may be acquired are described above. For instance, target 230 may be bootstrapped. DLLs or plug-ins may be loaded. An interface may also be retrieved. Step 510 may be performed by acquisition module 340. After which, the target process may enter the main function. The code of main function may be under more control by the host system.

In step 512, the impersonation token may be replaced with a naked token. This step may be performed by replacement module 250. The impersonation token may be removed and a naked token used in its place. This may be performed by replacement module 250 or API module 316. In another embodiment, the impersonation token may be lowered to be naked. This may be performed by security module 250 or lower token module 318. An IPC communication channel may be setup between processes before the token is dropped.

In step 514, the child process is executed with the naked token and the acquired resources. This step may be performed with execution module 410. According to a further embodiment, target 230 may revert to a naked token following a global initialization function. Untrusted code may start running only after the global initialization function returns. Steps 510 to 514 may be performed by a child process or thread, such as target 230.

Embodiments of the present invention may be used for many and different applications. Altered token sandboxing, such as user mode, may be used for, but not limited to, web browsers. Loading and executing untrusted code may take place when a browser goes to a new website. Though a browser's code may be trusted, renderers may be sandboxed for each new website, aspect of a website, or content associated with a website. Such sandboxing may provide for better host system security. This may result in a better experience for both the user of the browser and for legitimate providers of web content.

Aspects of the present invention, for exemplary system 100, system 200, system 300, system 400 and/or method 500 or any part(s) or function(s) thereof may be implemented using hardware, software modules, firmware, tangible computer readable media having instructions stored thereon, or a combination thereof and may be implemented in one or more computer systems or other processing systems. Examples of computer systems include, but are not limited to, a computer, mobile device (such as a handheld mobile phone, smart phone, personal data assistant, or laptop), workstation, server, cluster of computers, embedded system, game console, kiosk, set-top box, or television.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for altered token sandboxing, comprising:
   obtaining a naked token including no privileges;
   creating a process using the naked token;
   suspending the process, after the process has been created with the naked token;

obtaining an impersonation token having more privileges than the naked token;

resuming the process with the impersonation token;

acquiring one or more resources needed for the process using the impersonation token after the process has been resumed;

replacing, in the resumed process, the impersonation token with the naked token after the one or more resources are acquired; and executing the resumed process with the naked token and the acquired resources.

2. The method of claim 1, further comprising executing the resumed process prior to entering a main function, whereby the acquired resources provide for a complete execution of the main function.

3. The method of claim 1, wherein during execution of the resumed process with the naked token, the method further comprises:

intercepting a request when at least one additional resource is required subsequent to the replacing step;

evaluating a policy based upon the request; and acquiring at least one additional resource for the resumed process based upon the policy evaluation.

4. The method of claim 1, wherein the acquiring step further comprises acquiring at least one resource managed by an operating system necessary to execute a main function of the process.

5. The method of claim 4, wherein the at least one necessary resource includes at least one of a resource required to execute an operating system loader, a dynamic link library (DLL), or a plug-in.

6. The method of claim 1, wherein the impersonation token comprises one or more handles required to acquire the resources necessary for the process.

7. The method of claim 1, wherein the replacing step further comprises:

removing the impersonation token from the resumed process; and using the naked token in the resumed process.

8. The method of claim 1, wherein the replacing step further comprises lowering the impersonation token to the naked token.

9. The method of claim 1, further comprising granting a secure inter-process communication (IPC) channel between the process and a second process prior to the replacing step.

10. The method of claim 1, wherein the resumed process is a child process of a parent process having a user token.

11. The method of claim 10, wherein the impersonation token is based on the user token.

12. The method of claim 1, wherein the naked token cannot access any operating system resources.

13. A system for altered token sandboxing including one or more processors and a memory, the memory including instructions to perform operations comprising:

obtaining a naked token including no privileges;

creating a process using the naked token;

suspending the process, after the process has been creating with the naked token;

obtaining an impersonation token having more privileges than the naked token;

resuming the process with the impersonation token;

acquiring one or more resources needed for the process using the impersonation token after the process has been resumed;

replacing, in the resumed process, the impersonation token with the naked token after the one or more resources are acquired; and executing the resumed process with the naked token and the acquired resources.

14. The system of claim 13, wherein the resumed process is a child process of a parent process having a user token.

15. The system of claim 14, wherein the impersonation token is based on the user token.

16. The system of claim 13, wherein the operations further comprise:

creating a process using the naked token and suspending the process prior to a first instruction executing; and resuming the suspended process.

17. The system of claim 13, wherein the instructions further comprise generating at least one application programming interface (API) wrapper.

18. The system of claim 13, wherein the impersonation token comprises one or more handles required to acquire the resources necessary for the process.

19. The system of claim 13, wherein the operations further comprise acquiring at least one resource managed by an operating system necessary to execute a main function of the process.

20. The system of claim 13, wherein the operations further comprise lowering the impersonation token to the naked token.

21. The system of claim 13, wherein the operations further comprise replacing the impersonation token with the naked token.

22. The system of claim 13, wherein the operations further comprise generating a request for additional resources.

23. The system of claim 22, wherein the operations further comprise:

intercepting the request for additional resources;

receiving the intercepted request, evaluating the intercepted request against a policy, and returning a policy evaluation result; and receiving the policy evaluation result from the evaluation module, executing at least one requested operation, and returning at least one additional resource to the execution module.

24. The system of claim 13, wherein the naked token cannot access any operating system resources.

* * * * *